United States Patent [19]

Tomida

[11] Patent Number: 5,914,149

[45] Date of Patent: Jun. 22, 1999

[54] TRANSPARENT LIQUID FOOD

[75] Inventor: Masaaki Tomida, Tokyo, Japan

[73] Assignee: Mitsubishi-Kagaku Foods Corporation, Tokyo, Japan

[21] Appl. No.: 08/882,648

[22] Filed: Jun. 25, 1997

[30] Foreign Application Priority Data

Jul. 1, 1996 [JP] Japan .................................. 8-190082

[51] Int. Cl.$^6$ .................................. A23L 2/00; A23L 2/44
[52] U.S. Cl. ........................ 426/590; 426/589; 426/594; 426/597; 426/654
[58] Field of Search .................................. 426/590, 594, 426/597, 589, 654

[56] References Cited

FOREIGN PATENT DOCUMENTS 361242567  10/1986  Japan .

*Primary Examiner*—Helen Pratt
*Attorney, Agent, or Firm*—David G. Conlin; Christine C. O'Day; Dike, Bronstein, Roberts & Cushman, LLP

[57] ABSTRACT

A transparent liquid food of the present invention contains a sucrose fatty acid ester which has a constitutive fatty acid, which is a saturated or unsaturated fatty acid having 8 to 22 carbon atoms in aliphatic carbon chain thereof and having a monoester content of not less than 93% by weight, in which no cloudiness and precipitation in the transparent liquid foods, i. e., transparent beverages and foods arise when the sucrose fatty acid ester is added thereto.

10 Claims, No Drawings

TRANSPARENT LIQUID FOOD

BACKGROUND OF THE INVENTION

The present invention relates to a transparent liquid food, and more particularly, to a transparent liquid food including transparent beverages such as teas beverages which are extracts from tea leaves or other plants, straight coffee or the like; clear soups or brothes such as consommé soup, brothes of boiled beans, Japanese hotchpotch, water-boiled vegetables, daily dish, Japanese chowder or pickles, or the like; seasoning materials such as noodle soup or sauce; or the like.

It is widely known that sucrose fatty acid ester (hereinafter referred to as merely "SE") is added to the canned or packed low-acidic beverages containing milk components or precipitable components, such as coffee with milk, tea with milk, cocoa, potage soup, azuki-bean soup or the like, so as to prevent the spoilage thereof by thermoduric endospores (see "Nippon Shokuhin Kogyo Gakkaishi", 35(10), pp. 706–708 (1988) by Nobuyuki SUWA; and "The Canners Journal", 68(1), pp. 86–90 (1989) by Mitsuyuki TANAKA). Especially, it is known that the SE containing not less than 70% by weight of palmitic acid and not more than 30% by weight of stearic acid based on the weight of constitutive fatty acids thereof, and having a monoester content of 70 to 90% by weight (see Japanese Patent Application Laid-open (Kokai) No. 56-18578(1981) and Japanese Patent Application Laid-open (Kokai) No. 60-199345(1985)) are used for preventing the spoilage of foods.

As commercially available conventional SE used for preventing the spoilage of foods or the like, there have been exemplified an SE containing palmitic acid of about 80% by weight based on the weight of constitutive fatty acids thereof and having a monoester content of about 70% by weight ("Ryoto Sugar Ester P-1570" produced by Mitsubishi-Kagaku Foods Corporation), an SE containing palmitic acid of about 80% by weight based on the weight of constitutive fatty acids thereof and having a monoester content of about 80% by weight ("Ryoto Sugar Ester P-1670" produced by Mitsubishi-Kagaku Foods Corporation), or the like.

On the other hand, low-acidic teas beverages such as straight tea, Japanese tea, oolong tea or the like are unlikely to be spoiled by the endospores, because these teas beverages are low-nutritive as compared to the afore-mentioned canned or packed low-acidic beverages containing milk components or precipitable components, and catechin contained in the teas beverages exhibits an anti-bacterial property. Therefore, in general, the SE is not required to be added to these teas beverages.

However, recently, in the production of the afore-mentioned teas beverages, there has been a tendency that the extraction of tea leaves is carried out at a low temperature to enhance taste of the teas beverages. In this case, the concentration of catechin extracted from tea leaves in the teas beverages becomes low, so that the growth of endospores in the teas beverages cannot be sufficiently prevented. On the contrary, if the teas beverages are heat-sterilized at an elevated temperature to prevent the spoilage thereof, taste or flavor of the teas beverages is disadvantageously lessened. In addition, especially in the case of the low-acidic beverages which are hot-filled in PET bottles or glass bottles after the heat sterilization, there arises such a problem that the beverages undergo secondary contamination from their containers or production lines.

Also, among the teas beverages, barley water or blended tea has no or extremely small catechin content and, therefore, easily suffers from the spoilage by the endospores. Further, even in the case of straight coffee, a certain kind of endospores can be grown and propagated therein, thereby still causing the spoilage thereof.

Also, in the case of foods which are subjected to retort-sterilization, such as boiled beans, Japanese hotchpotch, water-boiled vegetables, daily dish, Japanese chowder, pickles or seasoning materials, it is required that the sterilizing condition thereof is moderated in order to prevent the lowering of a quality thereof such as texture upon eating, or taste or flavor. However, in such a case, the thermoduric endospores still survives through the sterilization and, therefore, causes the spoilage of these foods. In order to solve the above problems, it is demanded that SE having an anti-bacterial property is added to clear soups or brothes of the afore-mentioned foods.

SUMMARY OF THE INVENTION

In the case of inherently turbid and precipitable low-acidic beverages such as canned or packed low-acidic beverages containing milk components or precipitable components, the addition of SE causes no serious problem. On the other hand, in the case of transparent beverages such as the afore-mentioned teas beverages and clear soup or broth, there arises a problem that even the addition of SE having a hydrophilic-lipophilic balance (HLB) as high as about 16 thereto causes cloudiness or precipitation after its long-term preservation. For this reason, at present, the SE is difficult to be added to such transparent beverages.

Further, in order to prevent the spoilage of clear soup or broth by the endospores, the SE having a monoester content of 70 to 90% by weight has been added thereto because such an SE has the effect of suppressing the growth of endospores. However, even though such an SE is added to the soup or broth, there may arise a problem that cloudiness or precipitation is caused therein after long-term preservation thereof. On the contrary, when a small amount of the SE is added thereto so as not to cause the cloudiness and precipitation, the SE cannot sufficiently exhibit the effect of suppressing the growth of endospores.

As a result of various studies by the present inventors, it has been found that by using a higher content (for example, not less than 93% by weight) of monoester in the SE which is generally in the form of a mixture of mono-, di- and tri-ester, beverages and foods to which such an SE is added, do not cause any cloudiness or precipitation even after long-term preservation, and therefore, such an SE can be applied to beverages and foods required to be transparent and can effectively prevent the beverages and foods from being spoiled by endospores even though the SE is used therein in a smaller amount than that of commercially available conventional SE for preventing such a spoilage. The present invention has been attained on the basis of the finding.

It is an object of the present invention to provide a transparent liquid foods containing a sucrose fatty acid ester (SE), in which no cloudiness and precipitation in the transparent liquid foods, i. e., transparent beverages and foods arise when the SE is added thereto, and therefore, can be suitably applied to transparent beverages and clear soups or brothes.

To accomplish the aim, in an aspect of the present invention, there is provided a transparent liquid food containing an effective amount of a sucrose fatty acid ester (SE) which comprises, as a constitutive fatty acid, a saturated or unsaturated fatty acid having 8 to 22 carbon atoms in aliphatic carbon chain thereof, and has a monoester content of not less than 93% by weight.

DETAILED DESCRIPTION OF THE INVENTION

The present invention is described in detail below. The transparent liquid foods according to the present invention contain an effective amount of a sucrose fatty acid ester (SE).

As methods for producing SE, there are known a method of reacting sucrose with a fatty acid-lower alkyl ester in an organic solvent such as N,N-dimethyl formamide or dimethyl sulfoxide in the presence of an alkali catalyst to conduct an ester-exchange reaction therebetween (Japanese Patent Publication (Kokoku) No. 35-13102(1960)), or the like. Also, the SE can be produced by the esterification of a fatty acid with sucrose. The SE products obtained by these methods are generally in the form of a mixture of mono-, di- and tri-ester.

In order to obtain the SE having a high mono-ester content used in the present invention from these SE mixtures, there can be used, for example, the method disclosed in Japanese Patent Application Laid-open (Kokai) No. 61-148190 (1986). That is, in this method, the solution containing each of these SE mixtures is introduced into a column filled with a synthetic adsorbent to conduct chromatographic development thereof through the column, so that a mono-ester fraction can be recovered from effluent flowed out of the column. Alternatively, the SE having a high mono-ester content can be produced by subjecting the SE mixtures to liquid-liquid extraction using water and an organic solvent.

Sucrose fatty acid esters commercially available contain impurities other than SE such as sucrose, fatty acids, fatty acid salts, water or the like. The term "monoester content" used throughout the present application is intended to mean a weight percentage of monoester in the SE compound.

In accordance with the present invention, as the aforementioned fatty acid, there can be used saturated or unsaturated fatty acids having 8 to 22 carbon atoms in aliphatic carbon chain thereof. Specific examples of the fatty acids may include caprylic acid, capric acid, lauric acid, myristic acid, palmitic acid, stearic acid, arachic acid, behenic acid, oleic acid, erucic acid, a mixture of these acids, or the like. Among them, myristic acid, palmitic acid, stearic acid or a mixture thereof are preferred, because these acids can well-balancedly and satisfactorily fulfill requirements of flavor, solubility and anti-bacterial property.

In the present invention, it is important that the monoester content of the SE is not less than 93% by weight. That is, in accordance with the present invention, it is required that the SE contains esters having a degree of substitution (degree of esterification) of not less than 2 in an amount of less than 7% by weight. When the monoester content in the SE is less than 93% by weight, the transparent liquid foods such as transparent beverages and foods to which the SE is added, suffer from cloudiness or precipitation after a long period of time has elapsed, so that the aim of the present invention cannot be accomplished. The monoester content in the SE is preferably not less than 95% by weight.

The SE used in the present invention may be a mixture of sucrose fatty acid esters comprising different fatty acids. In addition, the SE used in the present invention can be used in combination with other additives including emulsifiers such as polyglycerol fatty acid esters, organic acid monoglycerol fatty acid esters, enzyme treated lecithin, enzymolytic lecithin, sorbitan fatty acid esters, polyoxyethylene sorbitan fatty acid esters and lactic acid fatty acid ester, or stabilizing agents such as carrageenan, gum arabic and gum-xanthane, unless the addition of these additives adversely affects the qualities of the transparent liquid foods such as beverages and foods.

The beverages to which the SE used in the present invention is suitably applied to transparent beverages and clear soup or broth.

As the transparent liquid food according to the present invention, there can be exemplified transparent beverages having a pH of not less than 4.5, such as teas beverages, straight coffee or the like, clear soups, brothes or seasoning materials having a pH of not less than 4.5, or the like.

As the teas beverages, there can be exemplified extracts from tea leaves and extracts from plants other than tea leaves. Specific examples of the extracts from tea leaves (tea-leaves beverages in a narrow sense) may include green tea, roasted tea, refined green (gyokuro) tea, powdered tea, black tea, oolong tea or the like. Specific examples of the extracts from plants other than tea leaves (plant teas) may include grain teas such as barley water, brown rice tea, corn tea or the like, non-grain teas such as toctu tea, dokudami tea, rooibos tea, maté tea or the like, blended teas thereof, or the like.

Specific examples of the clear soup or broth may include consommé soup, soups or brothes of boiled beans, Japanese hotchpotch, water-boiled vegetables, daily dish, Japanese chowder, pickles or the like, seasoning materials such as noodle soup or sauce, or the like.

In accordance with the present invention, the transparent liquid food to which the SE is to be added, may be clear liquid without cloudiness and may have a transparency (To) of not less than 50% when measured by the following conditions using a spectrophotometer at 620 nm;

Solution to be measured: 5 time-dilution

Cell thickness: 1 cm

Transparency of water as a blank: 100%

The transparency of ordinary turbid liquid food such as milk coffee is not more than 5% at 5 time-dilution. (refer to Reference Example.)

The SE used in the present invention can be generally added to the transparent liquid foods such as beverages or foods in an amount of 10 to 3,000 ppm, preferably 20 to 300 ppm based on the whole liquid food. When the amount of the SE added is less than 10 ppm, a sufficient anti-bacterial effect cannot be obtained by the addition thereof. On the other hand, when the amount of the SE added is more than 3,000 ppm, the addition of the SE causes disadvantages such as deterioration in taste or flavor of the transparent liquid foods and increase in the production cost thereof. However, since the anti-bacterial effect of the SE is influenced by co-existing starch, fat, protein or the like (see Yoshiaki IKEGAMI "Report of Toyo Junior College of Food Technology and Toyo Institute of Food Technology", 16, pp. 101–105(1985) and Yoshiaki IKEGAMI "Report of Toyo Junior College of Food Technology and Toyo Institute of Food Technology", 17, pp. 65–75 (1987)), in the case where the SE used in the present invention is added to transparent liquid foods such as beverages and foods having a low content of starch, fat, protein and the like which damages an anti-bacterial property of the SE, the amount of the SE added to these transparent liquid foods is generally in the range of 20 to 300 ppm.

As the sealed containers in which the afore-mentioned beverages and foods are filled, there can be used plastic containers made of polyethylene, polypropylene, polystyrene, AS resin, ABS resin, polyacrylonitrile, polymethacryl-styrene, methacrylic resin, polyethylene terephthalate, polyvinyl alcohol, vinyl chloride resin or the like, cans, bottles, paper containers having a coating film made of plastic film or aluminum foil or the like. The beverages to which the SE used in the present invention is applicable are generally hot-filled after heat sterilization and therefore, tends to be contaminated by the containers or the production lines. For this reason, the sealed containers used for these beverages are preferably PET bottles or glass bottles because these bottles are not only excellent in heat resistance and mechanical strength, and also have a high transparency.

Microorganisms wherein the SE used in the present invention can effectively inhibit the growth thereof are not particularly restricted, but may generally include thermoduric endospores such as *Bacillus coagulans, Bacillus circulans, Bacillus cereus, Bacillus licheniformis, Bacillus stearothermophilus, Bacillus subtilis, Bacillus polymyxa, Clostridium sporogenes, Clostridium perfringens, Clostridium bifementans, Clostridium butyricum, Clostridium boturinum, Clostridium pasteurianum, Clostridium thermaceticum, Clostridium thermosaccharolyticum, Clostridium thermohydrosulfricum, Desulfotomaculum nigrificans* or the like.

The transparent liquid food according to the present invention can be prevented from suffering from not only cloudiness and precipitation but also rotting and spoilage even after preserved at an elevated temperature in hot vending machines for a long period of time.

The transparent liquid foods according to the present invention can also be prevented from being spoiled by mesophile without any cloudiness and precipitation during a long-term preservation, even when the transparent liquid foods are distributed or sold under a normal temperature condition. Also, the liquid foods are generally likely to cause cloudiness or precipitation when preserved under a low temperature condition for a long period of time. However, in accordance with the present invention, there can be provided high-quality transparent liquid foods which are free from any cloudiness or precipitation even under such a low-temperature preservation condition.

EXAMPLES

The present invention is described in detail below by way of examples, but the examples are not intended to limit the present invention.

EXPERIMENTAL EXAMPLE 1

Various SE samples as shown in Table 1 were dissolved in tap water at 70° C. to prepare solutions containing 1% by weight of SE. These solutions were allowed to stand at room temperature for cooling and then preserved at 5° C. for one week. Thereafter, the solutions were observed with respect to the dissolving condition thereof. The results are shown in Tables 1 and 2.

In Tables 1 and 2, the symbol "P" stands for palmitic acid; the symbol "S" for stearic acid; the symbol "L" for lauric acid; and the symbol "M" for myristic acid. Further, the mark "⊙" indicates that the SE was completely dissolved in water without any trace of precipitation; the mark "○" indicates that the solution was approximately transparent (translucent) but did not show a trace of precipitation; the mark "Δ" indicates that the solution suffered from slight cloudiness or precipitation; and the mark "X" indicates that the solution suffered from considerable cloudiness and precipitation.

Incidentally, the samples H to L as shown in Table 2 are comparative.

TABLE 1

| Sample | Content of monoester (wt %) | Content of di- and tri-esters (wt %) | Constitutive fatty acid (wt %) | | Cloudiness and precipitation in solution | |
|---|---|---|---|---|---|---|
| | | | | | Immediately after preparation | After one week preservation |
| A | 100 | 0 | P: 80 | S: 20 | ⊙ | ⊙ |
| B | 97.5 | 2.5 | P: 80 | S: 20 | ⊙ | ⊙ |
| C | 95 | 5 | P: 80 | S: 20 | ⊙ | ○ |
| D | 100 | 0 | P: 30 | S: 70 | ⊙ | ⊙ |
| E | 95 | 5 | P: 30 | S: 70 | ⊙ | ○ |
| F | 95 | 5 | P: 5 | M: 95 | ⊙ | ⊙ |
| G | 100 | 0 | L: 100 | — | ⊙ | ⊙ |

TABLE 2

| Sample | Content of monoester (wt %) | Content of di- and tri-esters (wt %) | Constitutive fatty acid (wt %) | | Cloudiness and precipitation in solution | |
|---|---|---|---|---|---|---|
| | | | | | Immediately after preparation | After one week preservation |
| H | 85 | 15 | P: 80 | S: 20 | ⊙ | X |
| I | 80 | 20 | P: 80 | S: 20 | ⊙ | X |
| J | 85 | 15 | P: 30 | S: 70 | ⊙ | X |
| K | 75 | 25 | P: 30 | P: 70 | ⊙ | X |
| L | 30 | 70 | P: 30 | S: 70 | X | X |

EXPERIMENTAL EXAMPLE 2

The SE samples as used in Experimental Example 1, were tested to determine minimum SE concentrations required for suppressing the growth of thermoduric endospores. Specifically, a culture medium comprising 0.1% by weight of glucose, 0.5% by weight of peptone, 0.3% by weight of extract of yeast, 0.2% by weight of common salt, 0.05% by weight of manganese sulfate and a required amount of each of the SE samples as used in Experimental Example 1, and having a pH of 7.2, was prepared. 20 ml of the thus-prepared culture medium was filled into each of test tubes which was then closed with an aluminum cap to sterilize the culture medium therein. $1.0 \times 10^6$ spores of Bacillus stearothermophilus were inoculated into the culture medium in each test tube and then cultivated at 55° C. for 10 days to determine the minimum concentration of each SE required to suppressing the growth of the endospores. The results are shown in Table 3. The samples I and K shown in Table 3 are comparative.

TABLE 3

<Concentration of sucrose fatty acid ester required for suppressing the growth of *Bacillus stearothermophilus*>

| | Concentration of SE | | | | | | | |
|---|---|---|---|---|---|---|---|---|
| Sample | 3 ppm | 4 ppm | 5 ppm | 6 ppm | 7 ppm | 8 ppm | 9 ppm | 10 ppm |
| A | + | + | − | − | − | − | | |
| C | + | + | + | − | − | − | − | |
| I | + | + | + | + | − | − | − | |
| K | | + | + | + | + | + | + | − |

(NOTE)
The mark "+" indicates that no suppression of the growth of the endospore was caused.
The mark "−" indicates that the growth of the endospore was prevented.

EXPERIMENTAL EXAMPLE 3

A culture medium comprising 1.0% by weight of glucose, 1.0% by weight of Bactopeptone, 1.0% by weight of extract of yeast, 0.05% by weight of common salt, 0.06% by weight of L-cysteine, 0.02% by weight of agar and a required amount of each of the SE samples as used in Experimental Example 1, and having a pH of 7.2, was prepared. After sterilized, 20 ml of the culture medium was filled into each of test tubes under a sterile condition. Each test tube was closed with a screw cap. $1.0 \times 10^6$ spores of Clostridium thermaceticum were inoculated into the culture medium in each test tube and then cultivated at 55° C. for 10 days to determine the minimum concentration of each SE required to suppressing the growth of the endospores. The results are shown in Table 4. The sample I shown in Table 4 is comparative.

TABLE 4

<Concentration of sucrose fatty acid ester required for suppressing the growth of *Clostridium thermaceticum*>

| | Concentration of SE | | | | | | | |
|---|---|---|---|---|---|---|---|---|
| Sample | 1 ppm | 2 ppm | 3 ppm | 4 ppm | 5 ppm | 6 ppm | 7 ppm | 8 ppm |
| A | + | + | − | − | − | − | | |
| C | + | + | − | − | − | − | − | |
| I | | + | + | + | − | − | − | − |

(NOTE)
The mark "+" indicates that no suppression of the growth of the endospore was caused.
The mark "−" indicates that the growth of the endospore was prevented.

REFERENCE EXAMPLE

The transparencies (T) of a variety of commercially available liquid foods were measured at a cell thickness of 1 cm and at 620 nm by a spectrophotometer SHIMAZU UV-1200V (manufactured by SHIMAZU Corporation) using water as a blank (100%). The results are shown in Table 5 below.

TABLE 5

| Food | Degree of dilution | T (%) |
|---|---|---|
| Green tea (produced by ITOEN Co., Ltd.) | 2 times | 98.6% |
| Blended tea (produced by COCA COLA Corp.) | 2 times | 96.5% |
| Straight coffee (produced by UCC Corp.) | 5 times | 76.0% |
| Soup of Japanese hotchpotch (produced by S & B FOOD Corp.) | 5 times | 94.3% |
| Soup of daily dish (produced by FUJIKKO Co., Ltd.) | 5 times | 90.6% |
| Milk coffee (produced by SUNTORY Corp.) | 5 times | 1.6% |
| Milk coffee (produced by POKKA Co., Ltd.) | 5 times | 4.2% |

EXAMPLE 1

50 g of roasted coffee beans for iced coffee was extracted with 700 g of deionized water maintained at 95° C. 60 g of sugar and a required amount of each SE with or without the other emulsifier were added to the extract. An additional amount of deionized water was added to the resultant mixture to adjust the total weight thereof to 1000 g. Further, sodium bicarbonate was added to the obtained mixture to adjust a pH thereof to 6.5. The thus-obtained coffee solution was sterilized at 121° C. for 10 minutes.

The coffee solution was poured into a PET bottle and was preserved at 35° C. for 1 week. After preparing a 5 time-diluted solution thereof, an absorbance coefficient of the coffee solution at 620 nm ($A_{620}$ nm) against the coffee solution without emulsifier was measured.

Also, the coffee solution was poured into a PET bottle to which $3 \times 10^5$ spores of Bacillus coagulans were inoculated, and preserved at 35° C. The appearance of the coffee solution was observed 2 weeks after initiation of the preservation. Further, the pH of the coffee solution was measured to confirm the growth of endospores 2 months after initiation of the preservation. The results of the observations and measurements were compared with those of a coffee solution to which no inoculation of the endospores was conducted, to determine whether or not any spoilage of the solution was caused.

The results are shown in Tables 6 and 7. In Tables 6 and 7, the mark "+" indicates that spoilage of the coffee solution was caused; the mark "−" indicates that no spoilage of the coffee solution was caused; the mark "⊚" indicates that the coffee solution was free from any trace of cloudiness and precipitation; the mark "○" indicates that the coffee solution were free from cloudiness but suffered from slight precipitation; the mark "Δ" indicates that the coffee solution suffered from slight cloudiness and precipitation; the mark "X" indicates that the solution suffered from considerable cloudiness and precipitation; and the mark "X X" indicates that the growth of endospores in the solution was recognizable. Incidentally, Table 7 shows the results of observations and measurements for comparative samples.

TABLE 6

<Results of preservation of straight coffee with sugar>

| Emulsifier | Minimum concentration of SE (ppm) | $A_{620\ nm}$ | Deterioration | Appearance |
|---|---|---|---|---|
| Sample A | 150 | — | – | ⊚ |
| Sample A | 500 | 0.021 | – | ⊚ |
| Sample B | 75 | — | – | ⊚ |
| Sample B | 150 | — | – | ⊚ |
| Sample C | 150 | — | – | ⊚ |
| Sample C | 500 | — | – | ⊚ |
| Sample F | 150 | — | — | ⊚ |
| Sample C (plus decagycerol monostearate) | 150 (+150) | 0.020 | – | ⊚ |
| Sample C (plus hexagycerol monostearate) | 150 (+150) | 0.026 | – | ⊚ |
| Sample C (plus citric acid monogyceride) | 150 (+100) | 0.015 | – | ⊚ |
| Sample C (plus carrageenan) | 150 (+50) | 0.017 | – | ⊚ |

TABLE 7

<Results of preservation of straight coffee with sugar>

| Emulsifier | Minimum concentration of SE (ppm) | $A_{620\ nm}$ | Deterioration | Appearance |
|---|---|---|---|---|
| Not added | 0 | 0.000 | + | ⊚ |
| Sample H | 150 | — | – | X |
| Sample I | 150 | 0.085 | – | X |
| Sample L | 150 | 0.200 | + | X |
| Decagycerol monostearate | 150 | — | + | ⊚ |
| Citric acid monogyceride | 100 | — | + | ⊚ |

EXAMPLE 2

200 g of commercially available tinned blended tea was filled into each glass bottle under a sterile condition. An aqueous solution containing the sterilized SE with or without the other emulsifier was added to the blended tea in each glass bottle.

The tinned blended tea was poured into a PET bottle and was preserved at room temperature for 1 week. After preparing a 2 time-diluted solution thereof, an absorbance coefficient of the tinned blended tea at 620 nm ($A_{620}$ nm) against the tinned blended tea without emulsifier was measured.

$2 \times 10^4$ spores of Bacillus licheniformis were inoculated into the mixture in each glass bottle and then sterilized at 93° C. for 10 minutes. The sterilized mixture was preserved at room temperature for 40 days. Thereafter, the blended tea in each glass bottle was observed with respect to spoilage and appearance thereof. The spoilage of the blended tea was determined by visual observation and by comparing a pH thereof with that of a blended tea to which no inoculation of the endospores was conducted.

The results are shown in Tables 8 and 9. In Tables 8 and 9, the mark "+" indicates that spoilage of the blended tea was caused; the mark "–" indicates that no spoilage of the blended tea was caused; the mark "⊚" indicates that the blended tea was free from any trace of cloudiness and precipitation; the mark "○" indicates that the blended tea was free from cloudiness but suffered from slight precipitation; the mark "Δ" indicates that the blended tea suffered from slight cloudiness and precipitation; the mark "X" indicates that the blended tea suffered from considerable cloudiness and precipitation; and the mark "X X" indicates that the growth of endospores in the blended tea was recognizable. Incidentally, Table 9 shows the results of observations and measurements for comparative samples.

TABLE 8

<Results of preservation of blended tea>

| Emulsifier | Minimum concentration of SE (ppm) | $A_{620\ nm}$ | Deterioration | Appearance |
|---|---|---|---|---|
| Sample A | 100 | 0.001 | – | ⊚ |
| Sample B | 100 | 0.003 | – | ⊚ |
| Sample C | 100 | 0.010 | – | ⊚ |
| Sample C | 500 | — | – | ⊚ |
| Sample E | 200 | 0.025 | – | ○ |
| Sample C (plus decagycerol monostearate) | 100 (+50) | 0.010 | – | ⊚ |
| Sample C (plus hexgycerol sesquistearate) | 150 (+50) | 0.013 | – | ⊚ |

TABLE 9

<Results of preservation of blended tea>

| Emulsifier | Minimum concentration of SE (ppm) | $A_{620\ nm}$ | Deterioration | Appearance |
|---|---|---|---|---|
| Not added | 0 | 0.000 | + | XX |
| Sample H | 600 | — | – | X |
| Sample I | 500 | 0.058 | – | X |
| Sample L | 100 | 0.047 | + | XX |
| Diacetyl tartaric acid monogyceride | 100 | 0.099 | + | XX |
| Sorbitan monostearate | 250 | 1.303 | + | XX |

EXAMPLE 3

50 liters of deionized water heated to 50° C. was added to 1,000 g of Japanese tea leaves (green tea). The mixture was allowed to stand for 10 minutes, thereby obtaining Japanese tea as an extract therefrom having a pH of 6.8.

The Japanese tea was poured into a PET bottle and was preserved at room temperature for 1 week. After preparing a 2 time-diluted solution thereof, an absorbance coefficient of the Japanese tea at 620 nm ($A_{620}$ nm) against the Japanese tea without emulsifier was measured.

The thus-obtained Japanese tea was divided into a plurality of parts each having a weight of 1500 g, into each of which $2 \times 10^2$ spores of Bacillus subtilis were then inoculated. Further, SE with or without the other emulsifier was added to the Japanese tea, and the mixture was sterilized at 95° C. for 15 minutes. The sterilized Japanese tea was filled into a PET bottle and preserved at room temperature. After preserved for 6 days, the appearance of the Japanese tea was observed. Further, 50 days after initiation of the preservation, the pH of the Japanese tea was measured. The measured pH of the Japanese tea was compared with that of Japanese tea which was inoculated with no endospores, to determine whether or not the spoilage of the inoculated Japanese tea was caused.

The results are shown in Tables 10 and 11. In Tables 10 and 11, the mark "+" indicates that spoilage of the Japanese tea was caused; the mark "−" indicates that no spoilage of the Japanese tea was caused; the mark "⊚" indicates that the Japanese tea was free from any trace of cloudiness and precipitation; the mark "○" indicates that the Japanese tea was free from cloudiness but suffered from slight precipitation; the mark "Δ" indicates that the Japanese tea suffered from slight cloudiness and precipitation; the mark "X" indicates that the Japanese tea suffered from considerable cloudiness and precipitation; and the mark "X X" indicates that the growth of endospores in the Japanese tea was recognizable. Incidentally, Table 11 shows the results of observations and measurements for comparative samples.

TABLE 10

<Results of preservation of Japanese tea>

| Emulsifier | Minimum concentration of SE (ppm) | $A_{620\ nm}$ | Deterioration | Appearance |
|---|---|---|---|---|
| Sample C | 100 | — | − | ⊚ |
| Sample C | 500 | 0.008 | − | ⊚ |
| Sample E | 200 | 0.005 | − | ⊚ |
| Sample E (plus decagycerol monostearate) | 150 (+50) | 0.007 | − | ⊚ |
| Sample C (plus hexagycerol sesqui-stearate) | 150 (+50) | 0.009 | − | ⊚ |

TABLE 11

<Results of preservation of Japanese tea>

| Emulsifier | Minimum concentration of SE (ppm) | $A_{620\ nm}$ | Deterioration | Appearance |
|---|---|---|---|---|
| Not added | 0 | 0.000 | + | ⊚ |
| Sample I | 500 | 0.063 | − | X |
| Diacetyl tartaric acid monogyceride | 150 | — | + | ⊚ |

EXAMPLE 4

15 liters of boiling water was added to 500 g of barley grains. The mixture was boiled for 5 minutes to obtain a barley water. The thus-obtained barley water was divided into a plurality of parts each having a weight of 250 g, into each of which $1 \times 10^5$ spores of Bacillus coagulans were then inoculated. Further, SE with or without the other emulsifier was added to each part of the barley water. The mixture was heated to 90° C. and filled into a can which was then closed by a screw cap. Thereafter, the tinned barley water was sterilized by heating at 120° C. for 5 minutes. After preserved at 45° C. for 60 days, the can was opened to determine whether or not the spoilage of the barley water was caused and to observe the appearance of the barley water. The determination as to whether or not the barley water was spoiled was conducted by visual observation and by comparing the pH of the barley water with that of barley water which was inoculated with no endospores.

The results are shown in Tables 12 and 13. In Tables 12 and 13, the mark "+" indicates that spoilage of the barley water was caused; the mark "−" indicates that no spoilage of the barley water was caused; the mark "⊚" indicates that the barley water was free from any trace of cloudiness and precipitation; the mark "○" indicates that the barley water was free from cloudiness but suffered from slight precipitation; the mark "Δ" indicated that the barley water suffered from slight cloudiness and precipitation; the mark "X" indicates that the barley water suffered from considerable cloudiness and precipitation; and the mark "X X" indicates that the growth of endospores in the barley water was recognizable. Incidentally, Table 13 shows the results of observations for comparative samples.

TABLE 12

<Results of preservation of barley water>

| Emulsifier | Minimum concentration of SE (ppm) | Deterioration | Appearance |
|---|---|---|---|
| Sample B | 150 | − | ⊚ |
| Sample F (plus decagycerol monostearate) | 150 (+50) | − | ○ |

TABLE 13

<Results of preservation of barley water>

| Emulsifier | Minimum Concentration of SE (ppm) | Deterioration | Appearance |
|---|---|---|---|
| Not added | 0 | + | XX |
| Hexaglycerol sesqui-stearate | 300 | + | XX |

EXAMPLE 5

The same procedure as defined in Example 4 was conducted except that the endospores to be inoculated was changed to 5×103 spores of Bacillus subtilis and the period of preservation to one week. The results are shown in Table 14 and 15.

In Tables 14 and 15, the mark "+" indicates that spoilage of the barley water was caused; the mark "−" indicates that no spoilage of the barley water was caused; the mark "⊚" indicates that the barley water was free from any trace of cloudiness and precipitation; the mark "○" indicates that the barley water was free from cloudiness but suffered from slight precipitation; the mark "Δ" indicated that the barley water suffered from slight cloudiness and precipitation; the mark "X" indicates that the barley water suffered from considerable cloudiness and precipitation; and the mark "X X" indicates that the growth of endospores in the barley water was recognizable. Incidentally, Table 15 shows the results of observations for comparative samples.

TABLE 14

<Results of preservation of barley water>

| Emulsifier | Minimum concentration of SE (ppm) | Deterioration | Appearance |
|---|---|---|---|
| Sample A | 300 | − | ⊚ |
| Sample C | 300 | − | ⊚ |
| Sample D | 400 | − | ⊚ |

TABLE 15

<Results of preservation of barley water>

| Emulsifier | Minimum concentration of SE (ppm) | Deterioration | Appearance |
|---|---|---|---|
| Not added | 0 | + | XX |
| Sample I | 300 | + | XX |
| Sample J | 400 | + | XX |
| Sample L | 400 | + | XX |

EXAMPLE 6

Commercially available Japanese hotchpotch was divided into ingredients and broth. The broth was then filtered through a filter paper to obtain a filtrate. $1\times10^5$/ml spores of Bacillus subtilis were inoculated into the broth obtained as the filtrate. Further, SE was added to the inoculated broth. The broth was filled together with the ingredients into a transparent retort pouch container. After sealing the container, the broth was heated at 123° C. for 5 minutes for the sterilization thereof. After preserved at 55° C. for 35 days, the container was opened to examine the spoilage and appearance of the broth therein. The determination as to whether or not the broth was spoiled was conducted by visual observation and by comparing the pH of the broth with that of broth which was inoculated with no endospores.

The results are shown in Tables 16 and 17. In Tables 16 and 17, the mark "+" indicates that spoilage of the soup was caused; the mark "−" indicates that no spoilage of the soup was caused; the mark "⊚" indicates that the soup was free from any trace of cloudiness; the mark "○" indicates that the soup suffered from extremely slight cloudiness; the mark "Δ" indicated that the soup suffered from slight cloudiness; the mark "X" indicates that the soup suffered from considerable cloudiness; and the mark "X X" indicates that the growth of endospores in the soup was recognizable. Incidentally, Table 17 shows the results of observations for comparative samples.

TABLE 16

<Results of preservation of Japanese hotchpotch>

| Emulsifier | Minimum concentration of SE (ppm) | Deterioration | Appearance |
|---|---|---|---|
| Sample A | 250 | − | ⊚ |
| Sample E | 200 | − | ⊚ |

TABLE 17

<Results of preservation of Japanese hotchpotch>

| Emulsifier | Minimum concentration of SE (ppm) | Deterioration | Appearance |
|---|---|---|---|
| Not added | 0 | + | XX |
| Sample H | 400 | − | X |
| Sample K | 400 | − | X |
| Sample L | 100 | + | X |

What is claimed is:

1. A transparent liquid food containing a sucrose fatty acid ester comprising, as a constitutive fatty acid, a saturated or unsaturated fatty acid having 8 to 22 carbon atoms in aliphatic carbon chain thereof and having a monoester content of not less than 93% by weight.

2. A transparent liquid food according to claim 1, wherein said monoester content is not less than 95% by weight.

3. A transparent liquid food according to claim 1, wherein the content of said sucrose fatty acid ester is contained in said transparent liquid food is 10 to 3,000 ppm.

4. A transparent liquid food according to claim 1, wherein said transparent liquid food is filled in a sealed container.

5. A transparent liquid food according to claim 1, wherein said constitutive fatty acid is palmitic acid, stearic acid, myristic acid or a mixture thereof.

6. A transparent liquid food according to claim 1, wherein said transparent liquid food is a transparent beverage.

7. A transparent liquid food according to claim 6, wherein said transparent beverage is a tea beverage.

8. A transparent liquid food according to claim 6, wherein said transparent beverage is straight coffee.

9. A transparent liquid food according to claim 1, wherein said transparent liquid food is clear soup, broth or seasoning material which is free from cloudiness.

10. A transparent liquid food according to claim 9, wherein said clear soup is a consommé soup.

* * * * *